May 31, 1927.

W. C. STEVENS

BEAD PLACING DEVICE

Filed July 17, 1925

1,630,722

INVENTOR.
WILLIAM C. STEVENS

BY

ATTORNEY.

Patented May 31, 1927.

1,630,722

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

BEAD-PLACING DEVICE.

Application filed July 17, 1925. Serial No. 44,357.

This invention relates to bead-positioning devices for use in building pneumatic tires.

According to the present procedures in modern tire-manufacturing plants, it is customary to build the tires on a collapsible core including a plurality of core sections removable from the interior of the tire and supported on a chuck mounted on the drive shaft of a tire building machine.

Heretofore, in positioning straight side beads on the carcass on the core during the building operations, bead-placing devices of various types have been employed. Usually such devices have been supported on stands or the like so as to be movable toward and from the core. In devices of this character, there is a problem in so guiding the bead into position on the core so that it will be in the proper position in the completed carcass.

The chief object of the present invention is to so design a core-supporting chuck and a bead-placing ring that the latter is slidable on the former into bead-placing position.

The foregoing and other objects are obtained by the construction illustrated in the accompanying drawings and described in detail below. It is to be understood that the invention is not limited to the specific form thereof as shown and described.

Figure 1:
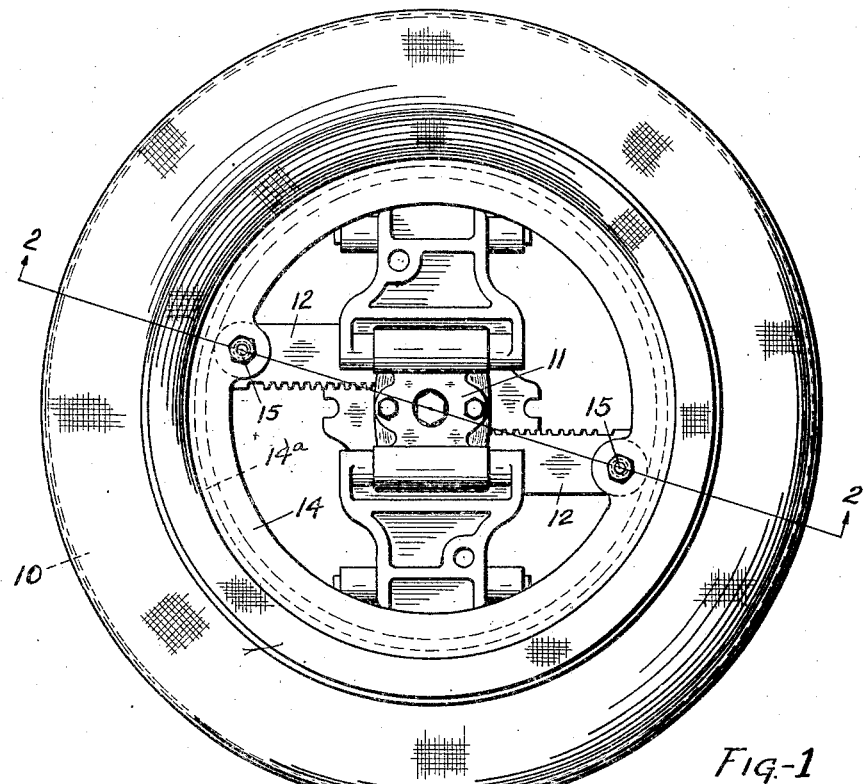
Figure 2:
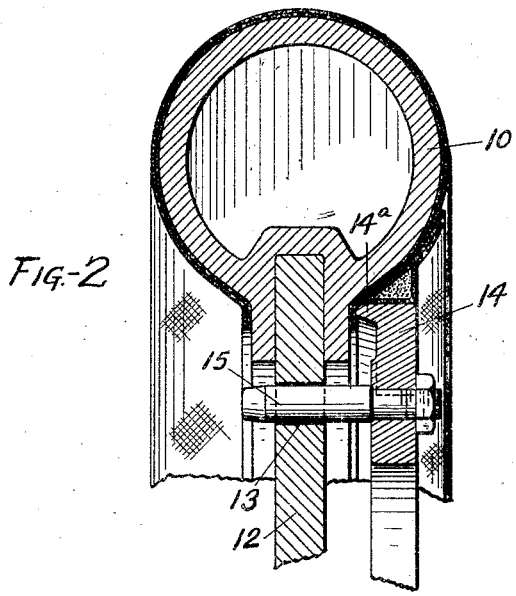

Of the accompanying drawings:

Figure 1 is a side elevation of a collapsible core having a partly built carcass thereon and showing the bead-placing ring in use; and Figure 2 is a section on line 2—2 of Figure 1.

Referring to the drawings, 10 represents a collapsible core of any suitable type carried by a chuck 11. The chuck 11 may be of the type which includes operating means for the core sections for moving them out of the core circle to collapsed positions, and in the example shown includes operating racks 12, 12 connected to opposite sections.

In the type of collapsible core shown, it has been found advantageous to guide the bead placing device on these racks 12. It is to be understood, however, that with various other types of cores and chucks, other more suitable supports may be found on which to guide the ring. Accordingly, in the present instance, racks 12 are each apertured to provide guides for the bead placer adjacent the core section to which it is connected as indicated at 13 (Figure 2).

A bead placing device of any suitable type may be employed. There is here shown a ring 14 of the cross sectional shape shown in Figure 2 and adapted to receive the bead on its outer periphery. The ring 14 has an inner flange 14$^a$ adapted to engage and hold in place the inner edges of the fabric or cord plies. For guiding it on the core chuck 11, pins 15, 15 are bolted or otherwise secured thereon so as to engage and slide in apertures 13. The ring 14 is thus positively positioned correctly with respect to core 10.

In practice, after the required number of inner plies have been applied to the core, the beads are set into position preferably one at a time. Two bead-placing rings 14 may be employed, one of which carrying the bead may be placed over the core onto the inner side thereof when the core is collapsed. The inner bead may be set in position by engaging pins 15 in apertures 13 and pushing the ring against the carcass. The core may now be rotated and the bead stitched into place, the core then being stopped and the ring removed. The outer bead may now be similarly set and stitched into place.

It will appear from the foregoing that a simple but highly effective bead-placing device has been provided. Modifications of the invention may be resorted to without departing from the spirit thereof or the scope of the appended claim.

What is claimed is:

The combination with a collapsible core and chuck, said chuck having apertures therein, of a bead-placing ring, said ring being adapted to be guided into position to set a bead on said core by pins secured thereon and adapted to slide into said apertures.

WILLIAM C. STEVENS.